United States Patent [19]
Watt

[11] 3,817,604
[45] June 18, 1974

[54] METHOD OF FOCUSING A HIGH-POWERED LASER BEAM

[75] Inventor: Bob E. Watt, Los Alamos, N. Mex.

[73] Assignee: The United States of America as represented by the United States Atomic Energy Commission, Washington, D.C.

[22] Filed: Jan. 3, 1973

[21] Appl. No.: 320,793

[52] U.S. Cl. ......... 350/232, 219/121 L, 331/94.5 T
[51] Int. Cl. ............................................. G02b 9/10
[58] Field of Search.......... 350/232, 212; 219/121 L

[56] References Cited
UNITED STATES PATENTS

| | | | |
|---|---|---|---|
| 3,606,522 | 9/1971 | Townes et al. | 350/247 UX |
| 3,609,584 | 9/1971 | Stitch et al. | 350/175 GN X |
| 3,622,739 | 11/1971 | Steffen | 219/121 L |

*Primary Examiner*—John K. Corbin
*Attorney, Agent, or Firm*—John A. Horan; Edward C. Waterscheid

[57] ABSTRACT

A method of providing a focal spot position independent of the input optical power of a laser beam. A negative lens is interposed such that focal spot motion caused by a changing refractive index in one lens element is canceled by an opposing motion in the negative lens element.

6 Claims, 6 Drawing Figures

METHOD OF FOCUSING A HIGH-POWERED LASER BEAM

BACKGROUND OF THE INVENTION

The invention described herein was made in the course of, or under, a contract with the U.S. Atomic Energy Commission. It relates to a method of focusing a high powered laser beam and more particularly to a method wherein suitable optics are interposed in the beam to provide the focusing means.

In laser fusion work, it is highly desirable that a powerful laser beam focus be maintained on a small point. A focal spot size on the order of 0.001 cm is desired. To obtain the requisite target temperature, very high optical power densities are required. At sufficiently high optical power densities, however, the refractive angles of focusing lenses or prisms are so affected that substantial focal spot motion can occur. There is presently nothing in the literature which indicates any awareness that the refractice angles of focusing lenses or prisms are affected by sufficiently high optical power densities.

SUMMARY OF THE INVENTION

I have found that the focal spot position for a high powered laser beam may be maintained independent of the input optical power by interposing a negative lens between the focusing lens and its focal point. The negative lens is so designed as to provide an opposing focal spot motion sufficient to cancel focal spot motion caused by a changing angle of refraction in the focusing lens. The power series expansion $$n = n_o + n_2 E^2 + n_4 E^4 + \ldots$$

where $n_o$ is the normal index of refraction and $n_2$, $n_4$, etc. are the nonlinear coefficients may readily be used to analyze focal spot motion in the focusing systems for high powered laser systems. Once the focal spot motion is determined both the focusing lens element and the negative lens element may be designed using these lens formulae.

DESCRIPTION OF THE PREFERRED EMBODIMENT

High-powered pulsed lasers produce large electromagnetic fields in the light pulse. These electrical fields change the refractive index of the medium in which the pulse is traveling. The change can be calculated from the power series expansion $$n = n_o + n_2 E^2 + n_4 E^4 + \ldots \quad (1)$$

where $n_o$ is the normal index of refraction and $n_2$, $n_4$, etc. are the nonlinear coefficients. When the electrical field E is expressed in electrostatic units, a typical value for $n_2$ in a laser glass is $2 \times 10^{-13}$. Values for $n_4$, $n_6$, etc. aren't known. Dropping the higher terms and noting that the power density p is proportional to $E^2$, the expansion can be given as $$n = n_o + n_\alpha \, p \quad (2)$$

where $p$ is the power density in W/cm$^2$ in the medium.

Figure 1:
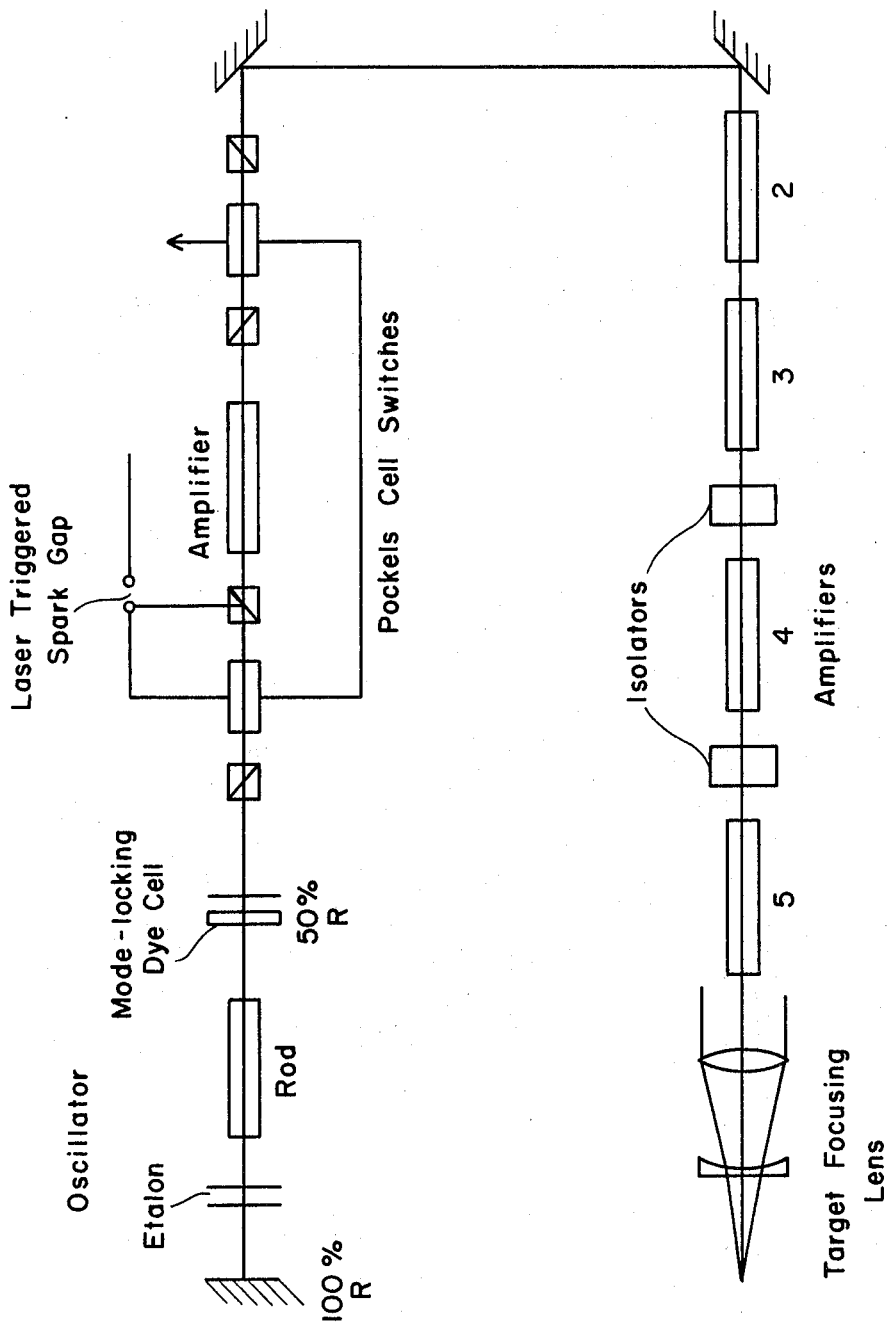
FIG. 1 is a diagrammatic representation of a high powered glass laser system capable of producing an energy density of $\sim 2 \times 10^{17}$ W/cm$^2$.

FIG. 1 is a block diagram of a neodymium glass laser system in which light pulses having a duration of 20–400 psec are generated in the oscillator. One of the pulses in the mode-locked train is selected by the first Pockels cell switch and amplified in the succeeding five amplifiers. The laser output if $10^{11}$W and the optical field is $2 \times 10^6$ V/cm. Under these conditions, $n_\alpha \, p = 0.9 \times 10^{-5}$ and the focal length of a lens is decreased by $1.8 \times 10^{-5}$. Laser improvements are expected to increase the power density $p$ by an order of magnitude with a corresponding increase in the effect on a lens focal length. It is desired to focus the beam on a target such that an energy density of $\sim 2 \times 10^{17}$ W/cm$^2$ is produced. To do this, a focal spot size of 0.001 cm is desired. This is equivalent to $4 \times 10^{-5}$ of the focal length.

By using glasses with differing $n_o$ and $n_\alpha$, it is possible to cancel the focal spot motion due to refraction angle changes in one lens element by an opposing motion produced in another lens element. Also, by locating elements in regions having different power densities, it is possible to cancel focal spot motions using only one kind of glass in the lens system. The manner in which this can be done is illustrated by FIG. 2.

Figure 2:
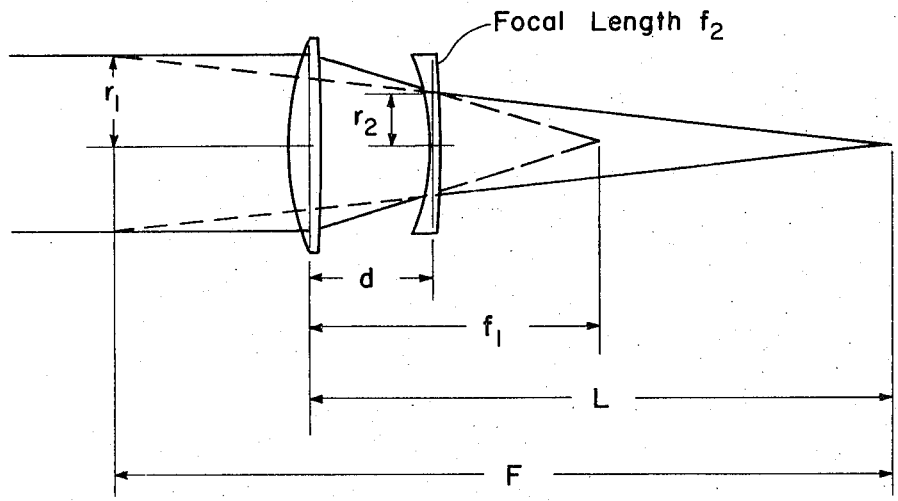
FIG. 2 shows a positive and negative lens system and the parameters which affect their design.

Values for the parameters listed in FIG. 2 are calculated using these lens formulae. Thus, effective focal length F for a pair of separated lenses is given by $$1/F = 1/f_1 + 1/f_2 - d/f_1 f_2 = 1/f_1 + 1/f_2 (1 - d/f_1). \quad (3)$$

The focal distance L from the front lens is given by $$L = F (1 - d/f_1) + d \quad (4a)$$

or $$\frac{1}{L-D} = \frac{1}{F\left(1 - \dfrac{d}{f_1}\right)} = \frac{1}{f_2} + \frac{1}{f_1\left(1 - \dfrac{d}{f_1}\right)} \quad (4b)$$

For these lenses, the focal length of the particular lens is given by $$1/f = (n - 1)(1/C_f + 1/C_b) \quad (5)$$

where $n$ is the index of refraction and $C_f$, $C_b$ are the radii of curvature for the two surfaces of the lens. Defining $$1/C_i = (1/C_{if} + 1/C_{ib}) \text{ for the ith lens, then}$$

$$1/f_i = (n_i - 1)/C_i = (n_{0i} - 1 + n_\alpha \, _i p_i)/C_i \quad (6a)$$

$$1/f_2 = (n_2 - 1)/C_2 = (n_{o2} - 1 + n_{\alpha\,2}p_2)/C_2 \,. \tag{6b}$$

Equations (6a) and (6b) show the dependence of the focal lengths on power density.

The conditions under which the focal distance L is independent of power density are determined as follows:

Since $d$ is a constant, $1/(L-d)$ is a constant. Therefore, taking the partial derivative of Eq. (4b) gives $$0 = \frac{\partial \frac{1}{f_2}}{\partial p_1} + \frac{1}{\left(1-\frac{d}{f_1}\right)} \frac{\partial\left(\frac{1}{f_1}\right)}{\partial p_1} + \frac{d}{f_1\left(1-\frac{d}{f_1}\right)^2} \frac{\partial \frac{1}{f_1}}{\partial p_1} - \frac{\partial\left(\frac{1}{f_2}\right)}{\partial p_1}$$

$$= \frac{1}{\left(1-\frac{d}{f_1}\right)} \left[1 + \frac{d}{(f_1-d)}\right] \frac{\partial \frac{1}{f_1}}{\partial p_1} - \frac{\partial\left(\frac{1}{f_2}\right)}{\partial p_1}$$

$$= \frac{1}{\left(1-\frac{d}{f_1}\right)^2} \frac{\partial\left(\frac{1}{f_1}\right)}{\partial p_1} \tag{7}$$

From Eqs. (6a) and (6b)

$$[\delta(1/f_1)]/(\delta p_1) = n_{\alpha\,1}/C_1\,,\quad \delta f_2/\delta p_2 = n_{\alpha\,2}/C_2\,.$$

Allowing for power loss by reflection at each lens element surface (fraction $R = ((n-1)/(n+1))^2$) and the reduced area illuminated in the second element, $$p_2 = \left(\frac{1-R}{1-\frac{d}{f_1}}\right)^2 p_1$$

and $$\frac{\partial\left(\frac{1}{f_2}\right)}{\partial p_1} = \frac{n_{\alpha 2}}{C_2}\left(\frac{1-R}{1-\frac{d}{f_1}}\right)^2.$$

Substituting in Eq. (7), $$-\frac{n_{\alpha 2}}{C_2}\left(\frac{1-R}{1-\frac{d}{f_1}}\right)^2 = \frac{1}{\left(1-\frac{d}{f_1}\right)^2} \frac{n_{\alpha 1}}{C_1} \cdot \frac{n_{\alpha 2}}{n_{\alpha 1}} (1-R)^2$$

$$= \frac{C_2}{C_1} = \left(\frac{n_2-1}{n_1-1}\right)\left(\frac{f_2}{f_1}\right), \tag{8}$$

$$-f_2/f_1 = (n_1 - 1/n_2 - 1)(n_{\alpha\,2}/n_{\alpha\,1})(1-R)^2, \tag{8a}$$

and $$-f_2/f_1 = (1-R)^2 \tag{8b}$$

when both lens elements are made of the same glass. The focal position will be independent of power if the focal lengths of the two elements are relates by Eq. (8). Equations (3) and (4) can readily be rewritten as $$\frac{E}{f_1} = \frac{1}{1 + \frac{f_1}{f_2}\left(1-\frac{d}{f_1}\right)}, \tag{3}$$

and $$\frac{L}{f_1} = \frac{1}{\frac{f_1}{f_2} + \left(\frac{1}{1-\frac{d}{f_1}}\right)} + \frac{d}{f_1}, \tag{4}$$

Figure 3:
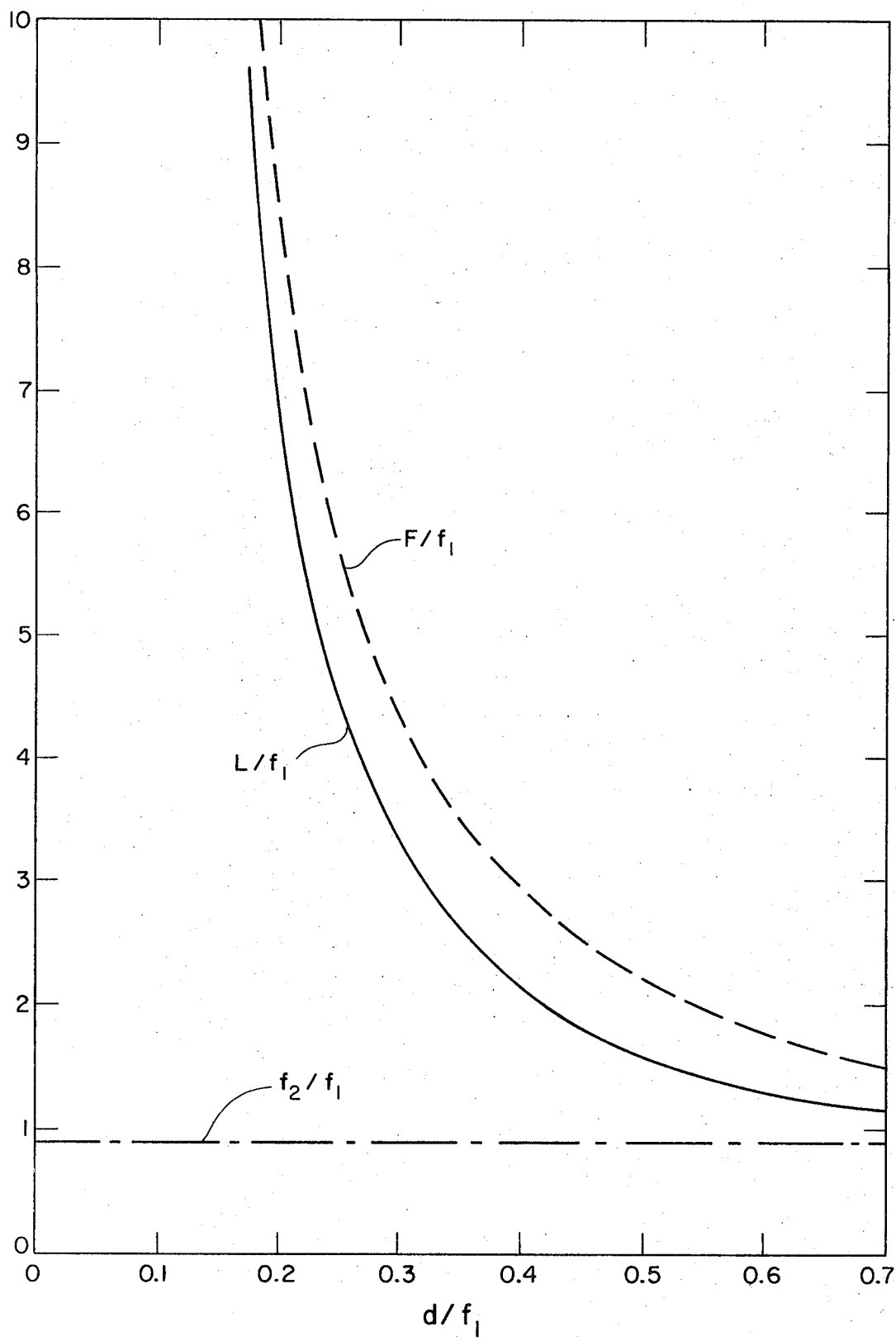
FIG. 3 is a plot of $F/f_1$, $L/f_1$ and $f_2/f_1$ as a function of $d/f_1$.

Values for $F/f_1$, $L/f_1$, and $f_2/f_1$, are plotted in FIG. 3 as a function of the ratio $d/f_1$.

Partial compensation for other aberrations may make it desirable to have lens surfaces concave toward the incident beam resulting in a focal spot for laser energy reflected from a lens surface.

When high-power laser pulses are focused in one of the lens elements, the glass is likely to be damaged. It is therefore apparent that a practical lens design must take into account the actual glass indices, thicknesses, individual surface curvatures, and the location of focii for reflected energy. These factors will indicate those values for $d/f_1$ which may result in establishment of a focal point within a lens and hence are undesirable.

Figure 4:
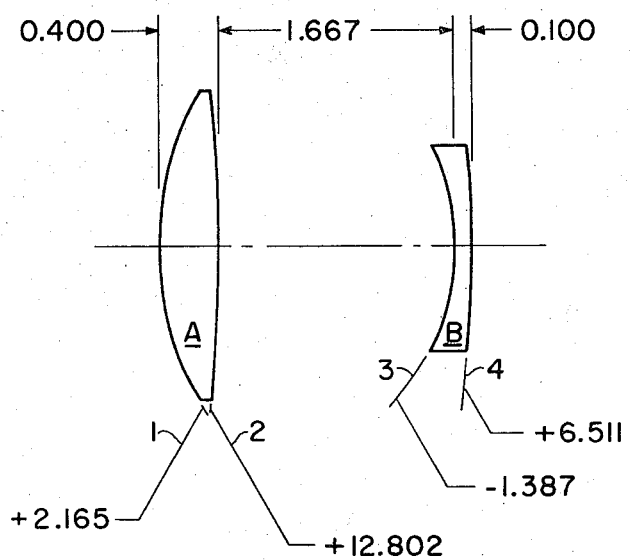
FIG. 4 shows one embodiment of a lens system useful with the laser system of FIG. 1.
Figure 5:
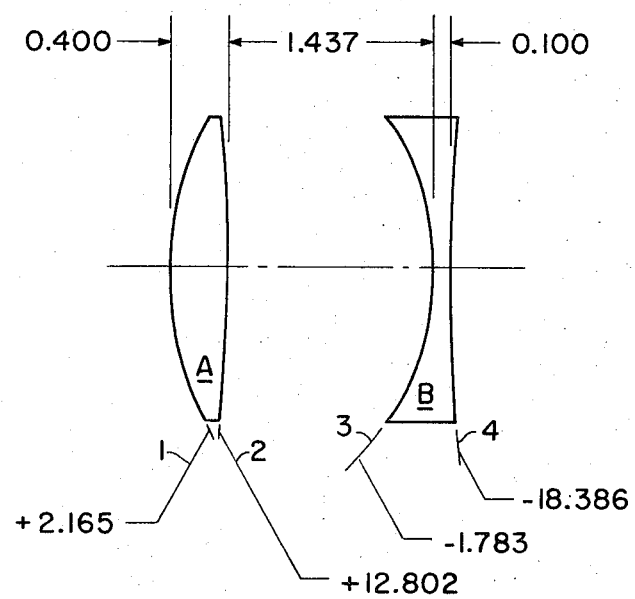
FIG. 5 shows a second embodiment of a lens system useful with the laser system of FIG. 1.

Examples of lens systems designed for use as the target focusing lens system of FIG. 1 are given in FIGS. 4 and 5. All dimensions are in inches. The lens systems of FIG. 4, which provides a focal point 7 to 8 inches from the first element, has the following lens prescription:

| SURFACE | RADIUS (+) FOR CONVEX RADIUS (−) FOR CONCAVE | AXIAL THICKNESS | OPTICAL GLASS | TRIM DIAMETER | LENS ELEMENT |
|---|---|---|---|---|---|
| 1 | +2.165±0.003 | 0.400 | JENA BK-7 | +0.000 | A |
| 2 | +12.802±0.019 | ±0.008 | NO.517642 | 2.100 / −0.003 | |
| 3 | −1.387±0.002 | 0.100 | JENA BK-7 | +0.000 | B |
| 4 | +6.511±0.009 | ±0.002 | NO.517642 | 1.400 / −0.002 | |

The lens system of FIG. 5, which provides a focal point 10 inches from the first element, has the following lens prescription:

| SURFACE | RADIUS (+) FOR CONVEX RADIUS (−) FOR CONCAVE | AXIAL THICKNESS | OPTICAL GLASS | TRIM DIAMETER | LENS ELEMENT |
|---|---|---|---|---|---|
| 1 | +2.165±0.003 | 0.400 | JENA BK-7 | +0.000 | A |
| 2 | +12.802±0.019 | ±.008 | 2.100 NO.517642 | −0.003 | |
| 3 | −1.783±0.003 | 0.100 | JENA BK-7 | +0.000 | B |
| 4 | −18.386±0.027 | ±.002 | 2.100 NO.517642 | −0.003 | |

Figure 6:
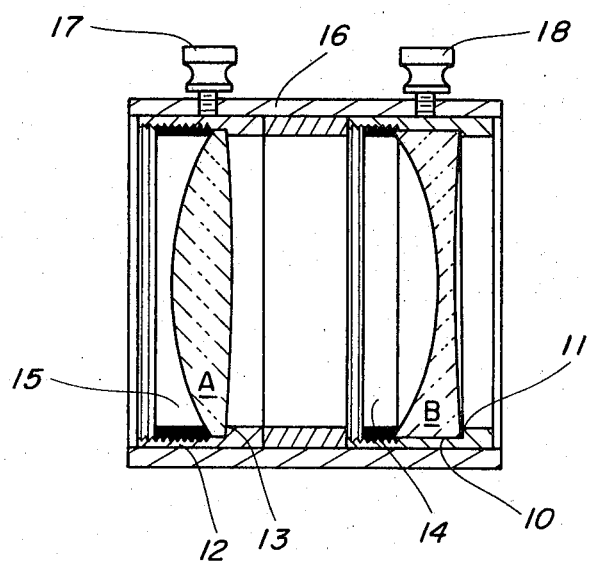
FIG. 6 shows a lens mount for use with the lens systems of FIGS. 4 and 5.

The manner in which lens elements A and B are held in a desired relationship is shown in FIG. 6. Cylinder 10 is provided with lip 11 which acts as a lens stop for lens element B/α. Likewise, cylinder 12 is provided with a lip 13 which acts as a lens stop for lens element A. Inserts 14, 15 are threaded into cylinders 10, 12, respectively, to hold lens elements A and B rigidly in place. Cylinders 10, 12, are held in place within cylinder 16 by means of alignment screws 17, 18.

What I claim is:

1. A method of focusing a high-powered laser beam wherein a focal spot position is maintained independent of the input optical power which comprises interposing a negative lens between a focusing lens and its focal point, said negative lens providing an opposing focal spot motion sufficient to cancel focal spot motion caused by a changing angle of refraction in the focusing lens, the refractive index $n$ of each lens being given by the expression $n = n_o + n_\alpha\, p$ where $n_o$ is the normal index of refraction, $n_\alpha$ the nonlinear coefficient and $p$ the power density of the beam in the lens.

2. The method of claim 1 wherein said negative lens is composed of a glass having values of $n_o$ and $n_\alpha$ sufficiently different from those of said focusing lens than the requisite opposing focal spot motion is produced for the particular spaced relationship between said lenses.

3. The method of claim 1 wherein said focusing lens and said negative lens are composed of the same optical glass and said negative lens is located in a region of said beam wherein the optical power density is sufficiently different from that of the beam entering said focusing lens that the requisite opposing focal spot motion is produced.

4. A lens system for use in focusing a high-powered laser beam wherein a focal spot position is maintained independent of the input optical power which comprises (a) a focusing lens, (b) a negative lens interposed between said focusing lens and its focal point, said negative lens being in spaced relationship to said focusing lens whereby it provides an opposing focal spot motion sufficient to cancel focal spot motion caused by a changing angle of refraction in said focusing lens, and (c) means for holding said lenses in said spaced relationship, the refractive index $n$ of each lens being given by the expression $n = n_o + n_\alpha\, p$ where $n_o$ is the normal index of refraction, $n_\alpha$ the nonlinear coefficient and $p$ the power density of the beam in the lens.

5. The lens system of claim 4 wherein said negative lens is composed of a glass having values of $n_o$ and $n_\alpha$ sufficiently different from those of said focusing lens that the requisite opposing focal spot motion is produced for the spaced relationship between said lenses.

6. The lens system of claim 4 wherein said lenses are composed of the same optical glass, and the spaced relationship between said lenses is determined by the difference in optical power densities of the region of the beam in which said lenses are located, said difference being sufficient to produce canceling focal spot motion.

* * * * *